(12) United States Patent
Guo et al.

(10) Patent No.: US 8,889,227 B2
(45) Date of Patent: Nov. 18, 2014

(54) METHOD FOR PREPARING MONOLITHIC CATALYST WASHCOAT

(75) Inventors: Yun Guo, Shanghai (CN); Guanzhong Lu, Shanghai (CN); Zhigang Zhang, Shanghai (CN)

(73) Assignee: East China University of Science & Technology, Shanghai (CN)

( * ) Notice: Subject to any disclaimer, the term of this patent is extended or adjusted under 35 U.S.C. 154(b) by 853 days.

(21) Appl. No.: 12/445,891

(22) PCT Filed: Feb. 14, 2007

(86) PCT No.: PCT/CN2007/000520
§ 371 (c)(1),
(2), (4) Date: May 6, 2009

(87) PCT Pub. No.: WO2008/046275
PCT Pub. Date: Apr. 24, 2008

(65) Prior Publication Data
US 2010/0304958 A1     Dec. 2, 2010

(30) Foreign Application Priority Data
Oct. 16, 2006   (CN) .......................... 2006 1 0117193

(51) Int. Cl.
| | |
|---|---|
| *B05D 3/00* | (2006.01) |
| *B05D 3/12* | (2006.01) |
| *B01J 35/04* | (2006.01) |
| *B01J 37/02* | (2006.01) |
| *B01J 37/00* | (2006.01) |
| *B01J 23/10* | (2006.01) |
| *B01J 21/04* | (2006.01) |

(52) U.S. Cl.
CPC .............. *B01J 35/04* (2013.01); *B01J 37/0215* (2013.01); *B01J 23/10* (2013.01); *B01J 37/0232* (2013.01); *B01J 21/04* (2013.01); *B01J 37/0036* (2013.01)
USPC .......................... 427/294; 427/350; 502/300

(58) Field of Classification Search
None
See application file for complete search history.

(56) References Cited

U.S. PATENT DOCUMENTS

| | | | | |
|---|---|---|---|---|
| 4,039,482 A | * | 8/1977 | Hoyer et al. ................... | 502/332 |
| 4,039,782 A | | 8/1977 | Burckhardt et al. | |
| 4,208,454 A | * | 6/1980 | Reed et al. ..................... | 427/238 |
| 4,550,034 A | * | 10/1985 | Shimrock et al. ............. | 427/243 |

(Continued)

FOREIGN PATENT DOCUMENTS

| | | |
|---|---|---|
| CN | 1233533 | 11/1999 |
| CN | 1245739 | 3/2000 |

OTHER PUBLICATIONS

Automotive catalytic converters: current status. [Jan Ka?par?, Paolo Fornasiero, Neal Hickey, Catal. Today,77 (2003):419~449].

*Primary Examiner* — Melvin C Mayes
*Assistant Examiner* — Sheng H Davis

(57) ABSTRACT

A method for preparing monolithic catalyst washcoat is disclosed and includes the following steps: preparing a coating slurry; pretreating a monolithic carrier; applying the coating slurry onto the monolithic carrier by vacuum spraying; removing the excess coating slurry by vacuum extraction; and obtaining the monolithic carrier applied with the washcoat after drying and calcination. The washcoat of 5-20 wt % can be obtained on the monolithic carrier of the present invention by one-off applying. The method can be used to prepare the washcoat on monolithic cordierite ceramic carrier, monolithic metal carrier, monolithic active carbon carrier or monolithic molecular sieve carrier. The obtained washcoat is uniform, and has good adhesion with the carrier and excellent repeatability.

5 Claims, 1 Drawing Sheet

(56) References Cited

U.S. PATENT DOCUMENTS

| | | |
|---|---|---|
| 4,631,268 A | 12/1986 | Lachman et al. |
| 4,657,880 A | 4/1987 | Lachman et al. |
| 4,711,009 A * | 12/1987 | Cornelison et al. ............. 29/890 |
| 4,912,077 A | 3/1990 | Lachman et al. |
| 5,070,893 A | 12/1991 | Dittrich et al. |
| 5,182,140 A | 1/1993 | Watanabe et al. |
| 6,627,257 B1 * | 9/2003 | Foerster et al. ................ 427/235 |
| 2003/0208085 A1 * | 11/2003 | Gaffney et al. ................ 558/321 |
| 2005/0092176 A1 * | 5/2005 | Ding et al. ......................... 95/90 |
| 2006/0154021 A1 * | 7/2006 | Ohno et al. .................... 428/116 |
| 2006/0205978 A1 * | 9/2006 | Yunoki et al. .................. 562/534 |
| 2007/0082128 A1 * | 4/2007 | Dittmeyer et al. .......... 427/248.1 |
| 2008/0124514 A1 * | 5/2008 | Fujdala et al. ................. 428/116 |

\* cited by examiner

METHOD FOR PREPARING MONOLITHIC CATALYST WASHCOAT

FIELD OF THE INVENTION

The present invention relates to a method for preparing monolithic catalyst washcoat, and more particularly to a method for preparing monolithic catalyst washcoat applied to fields of catalytic purification of automotive emission control, catalytic purification of toxic and hazardous air, and petrochemical industry.

BACKGROUND OF THE INVENTION

Monolithic catalysts consist of single blocks arranged with small parallel channels. In comparison with general catalyst, the monolithic catalysts show higher efficiency, lower power consumption, higher mechanical strength, and etc., and can be widely used in the fields of catalyst for automotive emission control, catalytic purification of toxic and hazardous air (such as volatile organic compounds, and nitrogen oxides), and petrochemical industry (such as hydrogen peroxide generated by anthraquinone process).

Generally, methods for preparing monolithic catalyst includes 3 types: (1) direct extrusion of prepared catalyst, disclosed in U.S. Pat. No. 4,912,077; (2) loading of active component on a monolithic carrier (such as active carbon, molecular sieve, and alumina) to obtain monolithic catalyst after activating, disclosed in U.S. Pat. Nos. 4,631,268 and U.S. Pat. No. 4,657,880; and (3) coating of an active washcoat on chemical inert material (such as cordierite ceramic or metal carrier) to obtain monolithic catalyst after loading active component and activating. In addition, prepared catalyst material also can be directly coated on a monolithic carrier to obtain monolithic catalyst after activating [Jan Kašpar, Paolo Fornasiero, Neal Hickey, Catal. Today, 77 (2003): 419~449]. The advantage of the first method for preparing monolithic catalyst is that: the inner wall of structure is composed of catalyst, and the content of catalyst is obviously greater than that of catalyst prepared by the other two methods. However, the disadvantage thereof is obvious: it needs different specific extrusion equipments according to the different catalyst systems; the mechanical strength of monolithic catalyst is dependent on the natural property of catalyst system, so as to uncertainly satisfy actual application needs; a portion of catalyst is embedded in the inner wall, so as to lower the entire utilization ratio. Accordingly, in actual applications, people mostly select the other two methods to prepare monolithic catalyst, especially the third method.

Generally, monolithic catalyst prepared by the third method includes carrier, active washcoat and active component, wherein traditional carriers includes heatproof ceramic material (such as cordierite ceramic carrier), alloy material (such as Fe—Cr—Al alloy), and etc. Because the specific surface area of the carrier is relatively small (for ex. the specific surface area of cordierite ceramic carrier is smaller than 1 $m^2/g$), the active component of catalyst can not be highly dispersed. Therefore, the active washcoat with large specific surface area must be coated. On one hand, the active washcoat can provide support for dispersion of the active component. On the other hand, the washcoat can modify active phase structure of the active component of the catalyst, in order to increase the activity and the stability of the catalyst. As a result, the method for preparing the washcoat is important to monolithic catalyst.

Presently, the method for preparing the washcoat mainly includes steps of: (1) pretreating the monolithic carrier, such as drying, calcining, and etc.; (2) preparing different coating slurry/solution according needs of catalyst system, such as slurry formed by ball-milling coating material (including boehmite and active carrier), water, adhesive, and etc.; (3) immersing the treated carrier in the prepared slurry/solution; (4) removing the excess slurry/solution in the, and then blowing out the remaining solution in channels by compressed air; and (5) drying, and calcining. In the method for preparing the washcoat, except for the properties of the coating slurry, the coating method of the coating slurry also affects the uniformity and the stability of the washcoat.

In addition, when executing the large-scale production of monolithic catalyst, the step of blowing the coating slurry by compressed air after coating easily lowers the uniformity and the stability of the washcoat.

SUMMARY OF THE INVENTION

An object of the present invention is to provide a method for preparing monolithic catalyst washcoat, which can solve the problems existing in the traditional technology and satisfy needs of the large-scale production of monolithic catalyst.

The method for preparing monolithic catalyst washcoat of the present invention comprises the following steps of:
  preparing a coating slurry;
  pretreating a monolithic carrier;
  applying the coating slurry onto the monolithic carrier by vacuum spraying;
  removing the excess coating slurry by vacuum extraction; and
  obtaining the monolithic carrier applied with the washcoat after drying and calcination.

In steps of the foregoing method, the process for preparing the coating slurry comprises steps of: using coating material and water as raw material, adding an appropriate adhesive, and ball-milling about 1-24 hours, so as to obtain the coating slurry; wherein the coating material includes boehmite, alumina, silica, rare earth oxide, alkaline earth oxide, transition metal oxide, or mixture thereof; the adhesive is boehmite, silica sol, cellulose, polyvinyl alcohol, or mixture thereof; the solid content of the coating material is 10-60 wt %; the content of the adhesive is 1-10 wt %, the range of particle diameter thereof is from 20 nm to 10 um, and the viscosity thereof is 10-40 mPa·S.

The process for applying the coating slurry onto the monolithic carrier by vacuum spraying comprises steps of: placing the monolithic carrier into a hermetic container; vacuuming until the pressure therein is 0.01 Pa-0.05 MPa; spraying the prepared coating slurry onto the monolithic carrier under vacuum; and then placing it at rest about 1-15 minutes.

The process for removing the excess coating slurry by vacuum extraction comprises steps of: placing the applied monolithic carrier on a hermetic container having an elastic sealing ring; and then removing the excess coating slurry in channels of the carrier by vacuuming extraction, wherein the excess coating slurry can be collected and reused.

The process for drying and calcination comprises steps of: firstly drying the applied carrier under 100-120° C. about 2-24 hours; and then calcining under 400-900° C. about 2-4 hours, so as to obtain the monolithic carrier applied with the washcoat of the present invention after naturally cooling.

The monolithic carrier of the present invention comprises monolithic cordierite ceramic carrier, monolithic metal carrier, monolithic active carbon carrier or monolithic molecular sieve carrier.

The washcoat of 5-20 wt % can be formed on the monolithic carrier of the present invention by one-off applying, and the performance thereof is better than that of the washcoat prepared by immersion and air blowing method. The method of the present invention can be used to prepare a washcoat on a cordierite ceramic carrier and a metal honeycomb carrier. The obtained washcoat is uniform, and has good adhesion with the carrier and excellent repeatability.

DETAILED DESCRIPTION OF THE PREFERRED EMBODIMENTS

Figure 1:
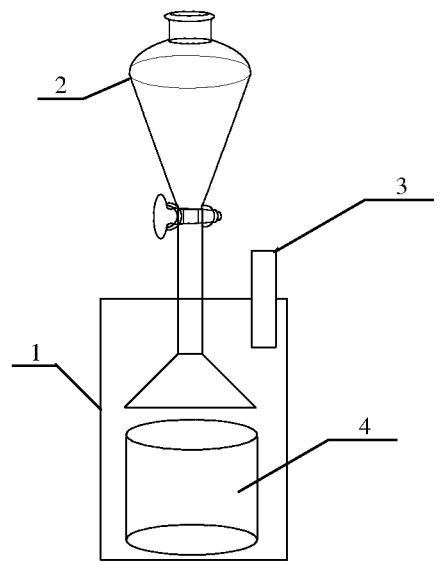
FIG. 1 is a structural diagram of a device for vacuum spraying a coating slurry.

Referring now to FIG. 1, a device for vacuum spraying a coating slurry according to the present invention comprises: a hermetic container 1 for placing a monolithic carrier 4; a coating slurry tank 2 disposed on the hermetic container 1 and communicated with the hermetic container 1; and a vacuum opening 3 disposed on the hermetic container 1 and communicated with the hermetic container 1, wherein the vacuum opening 3 is communicated with a vacuum generation device.

Figure 2:
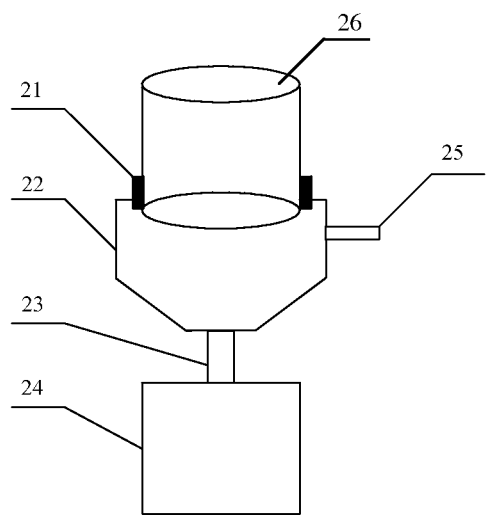
FIG. 2 is a structural diagram of a vacuum extracting device for removing the excess coating slurry in channels of a monolithic carrier.

Referring now to FIG. 2, a vacuum extracting device for removing the excess coating slurry in channels of a monolithic carrier 26 applied with the coating slurry according to the present invention comprises: a recess container 22 for placing the monolithic carrier 26 applied with the coating slurry; an elastic sealing ring disposed on the recess container 22; a pipe 23 disposed below the recess container 22 and communicated with the recess container 22; a coating slurry storage tank 24 communicated with the pipe 23; and a vacuum opening 25 disposed on the recess container 22 and communicated with the recess container 22, wherein the vacuum opening 25 is communicated with a vacuum generation device.

Five embodiments are provided hereinafter.

Embodiment 1

The devices as shown in FIGS. 1 and 2 are used.

A circular cordierite ceramic carrier 4 with the volume of 1.6 liter and 400 channel holes is adopted, and dried under 120° C. Then, placing it into the hermetic container 1 as shown in FIG. 1, and vacuuming until the pressure is 0.01 MPa. Placing 500 g boehmite and 1000 g water (the weight ratio is 1:2) into a ball milling can, and adjusting the pH value to 4 by adding nitric acid, so as to obtain the coating slurry after ball-milling about 1 hour.

Applying the prepared coating slurry through a nozzle of the coating slurry tank 2 as shown in FIG. 1.

Placing it at rest about 3-5 minutes, and then taking out the carrier 4 to place it on the device as shown in FIG. 2, wherein the carrier 4 is fixed and sealed by the sealing ring 21, and then the excess coating slurry in channels is removed by vacuuming.

Rotating the applied carrier 4 under room temperature about 24 hours to dry it, and calcining it under 550° C. about 3 hours. The loading of the washcoat (washcoat weight/carrier weight) is 10.5 wt %.

Embodiment 2

The preparation of the embodiment 1 is used, wherein the coating slurry is prepared under the conditions: the weight ratio of boehmite and water is 1:1.5 and the pH value is 4. The remaining process is the same as the embodiment 1. The loading of the washcoat is 12.5 wt %.

Embodiment 3

The preparation of embodiment 1 is used, wherein the composition of raw material is $\gamma\text{-}Al_2O_3$:boehmite:water=10:1:20 and the pH value is adjusted to 3 by adding nitric acid. The coating slurry is obtained after ball-milling about 12 hours. The average particle diameter of the coating slurry is 4-5 um, and the viscosity thereof is 25 mPa·S. The remaining process is the same as the embodiment 1. The loading of the washcoat is 13 wt %.

Embodiment 4

The preparation of embodiment 1 is used, wherein the composition of raw material is $\gamma\text{-}Al_2O_3$:boehmite:water=10:1:15 and the pH value is adjusted to 3 by adding nitric acid. The coating slurry is obtained after ball-milling about 12 hours. The average particle diameter of the coating slurry is 4-5 um, and the viscosity thereof is 35 mPa·S. The remaining process is the same as the embodiment 1. The loading of the washcoat is 15.5 wt %.

Embodiment 5

The preparation of embodiment 1 is used, wherein the composition of raw material is $\gamma\text{-}Al_2O_3$:boehmite:Ce—Zr solid slurry:water=10:1:5:15 and the pH value is adjusted to 3 by adding nitric acid. The coating slurry is obtained after ball-milling about 12 hours. The average particle diameter of the coating slurry is 5-6 um, and the viscosity thereof is 35 mPa·S. The remaining process is the same as the embodiment 1. The loading of the washcoat is 18.5 wt %.

The invention claimed is:

1. A method for preparing monolithic catalyst washcoat, characterized in that the method comprises:

preparing a coating slurry by using coating material and water as raw material, wherein the range of average particle diameter of the coating material of the coating slurry is from 20 nm to 10 um, and the viscosity is 10-40 mPa·S;

pretreating a monolithic honeycomb carrier by drying or calcining;

placing the monolithic honeycomb carrier into a hermetic container; and vacuuming the hermetic container to 0.01 Pa-0.05 MPa; using a nozzle of a coating slurry tank disposed on the hermetic container to apply the prepared coating slurry into channels in the monolithic honeycomb carrier from the top of the monolithic honeycomb carrier by vacuum spraying under vacuum and then placing the monolithic honeycomb carrier at rest about 1-15 minutes under the vacuum, wherein processes of applying the prepared coating slurry and placing the monolithic honeycomb carrier are in the vacuum;

taking out the monolithic honeycomb carrier from the hermetic container to place the monolithic honeycomb carrier on a recess container having an elastic sealing ring; removing the excess coating slurry in the channels in the monolithic honeycomb carrier from the bottom of the monolithic honeycomb carrier by vacuum extraction; and collecting the excess coating slurry removed by vacuum extraction for being reused; and obtaining the monolithic honeycomb carrier applied with the washcoat after drying and calcination.

2. The method for preparing monolithic honeycomb catalyst washcoat according to claim 1, characterized in that the process for preparing the coating slurry comprises steps of: using coating material and water as raw material, adding an adhesive, and ball-milling about 1-24 hours, so as to obtain the coating slurry; wherein the coating material includes boehmite, alumina, silica, rare earth oxide, alkaline earth oxide, transition metal oxide, or mixture thereof; the adhesive is boehmite, silica sol, cellulose, polyvinyl alcohol, or mixture thereof.

3. The method for preparing monolithic honeycomb catalyst washcoat according to claim 2, characterized in that the content of the coating material in the coating slurry is 10-60 wt %; and the content of the adhesive is 1-10 wt %.

4. The method for preparing monolithic honeycomb catalyst washcoat according to claim 1, characterized in that the process for drying and calcination comprises steps of: drying the applied monolithic honeycomb carrier under 100-120° C. about 2-24 hours; and then calcining under 400-900° C. about 2-4 hours.

5. The method for preparing monolithic honeycomb catalyst washcoat according to claim 1, characterized in that the monolithic honeycomb carrier comprises monolithic honeycomb cordierite ceramic carrier, monolithic honeycomb metal carrier, monolithic active carbon carrier or monolithic honeycomb molecular sieve carrier.

* * * * *